United States Patent
Misawa

(10) Patent No.: US 11,593,541 B2
(45) Date of Patent: Feb. 28, 2023

(54) PARTICLE BEHAVIOR SIMULATION METHOD AND PARTICLE BEHAVIOR SIMULATION SYSTEM

(71) Applicant: HITACHI, LTD., Tokyo (JP)

(72) Inventor: Tomonari Misawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 286 days.

(21) Appl. No.: 16/857,697

(22) Filed: Apr. 24, 2020

(65) Prior Publication Data

US 2020/0342151 A1 Oct. 29, 2020

(30) Foreign Application Priority Data

Apr. 25, 2019 (JP) .............................. JP2019-084371

(51) Int. Cl.
*G06F 30/25* (2020.01)
*G06F 111/10* (2020.01)

(52) U.S. Cl.
CPC .......... *G06F 30/25* (2020.01); *G06F 2111/10* (2020.01)

(58) Field of Classification Search
CPC .............................. G06F 30/25; G06F 2111/10
USPC .............................................................. 703/2
See application file for complete search history.

(56) References Cited

U.S. PATENT DOCUMENTS

| | | | | |
|---|---|---|---|---|
| 8,234,074 B2 * | 7/2012 | Lopez | ................... | G16C 10/00 702/19 |
| 8,781,799 B2 * | 7/2014 | Ichishima | .............. | G16C 10/00 703/2 |
| 9,183,676 B2 * | 11/2015 | McCulloch | ........... | G06T 19/006 |
| 11,288,419 B2 * | 3/2022 | Ishihara | ................... | G06F 30/25 |
| 2006/0235659 A1 * | 10/2006 | Stam | ....................... | G06T 13/20 703/2 |
| 2007/0239414 A1 * | 10/2007 | Song | ....................... | G06F 30/23 703/9 |

(Continued)

FOREIGN PATENT DOCUMENTS

| | | |
|---|---|---|
| JP | 2000-214134 A | 8/2000 |
| JP | 2010-108183 A | 5/2010 |
| KR | 10-2015-0102074 A | 9/2015 |

OTHER PUBLICATIONS

Sakai et al. ("Verification and validation of a coarse grain model of the DEM in a bubbling fluidized bed", Chemical Engineering Journal 244 (2014) 33-43) (Year: 2014).*

(Continued)

*Primary Examiner* — Iftekhar A Khan
(74) *Attorney, Agent, or Firm* — Volpe Koenig

(57) ABSTRACT

Provided is a particle behavior simulation method and a particle behavior simulation system for representing behavior of each particle in a large-scale particle system quickly and accurately. The particle behavior simulation system is configured to execute a coarse-graining processing of reconstituting a plurality of particles that mix with each other and constitute a predetermined powder as a particle system into a plurality of particle groups each including a plurality of the particles, an acting force calculation processing of calculating an acting force acting on each of the particle groups, and a mixing state calculation processing of calculating a parameter representing a mixing state of constituent particles of each of the particle groups after a predetermined time based on the calculated acting force.

8 Claims, 4 Drawing Sheets

FIG. 4

(56) References Cited

U.S. PATENT DOCUMENTS

| | | | | |
|---|---|---|---|---|
| 2010/0094608 A1* | 4/2010 | Oh | G06F 30/20 | 703/9 |
| 2010/0185420 A1* | 7/2010 | Ding | G06F 30/23 | 703/2 |
| 2012/0150496 A1* | 6/2012 | Yu | G06F 30/23 | 703/2 |
| 2014/0303945 A1* | 10/2014 | Ueno | G06F 30/20 | 703/2 |
| 2014/0358505 A1* | 12/2014 | Hashash | G06F 30/23 | 703/2 |
| 2015/0186565 A1* | 7/2015 | Stomakhin | G06F 30/20 | 703/6 |
| 2015/0187116 A1* | 7/2015 | Stomakhin | G06T 13/60 | 345/419 |
| 2015/0325028 A1* | 11/2015 | Kim | G06T 7/20 | 345/419 |
| 2016/0055279 A1* | 2/2016 | Ichishima | G06F 30/20 | 703/2 |
| 2017/0061048 A1* | 3/2017 | Grace | G06F 30/20 | |
| 2018/0023988 A1* | 1/2018 | Ogasawara | G01F 1/88 | 702/47 |
| 2018/0075173 A1* | 3/2018 | Stomakhin | G06F 30/20 | |
| 2019/0332733 A1* | 10/2019 | Ji | G06F 30/23 | |
| 2020/0401747 A1* | 12/2020 | Ishihara | G16Z 99/00 | |

OTHER PUBLICATIONS

Roberto Irizarry ("Fast Monte Carlo methodology for multivariate particulate systems—I: Point ensemble Monte Carlo", Chemical Engineering Science 63 (2008) 95-110) (Year: 2008).*

Deen et al. ("Review of discrete particle modeling of fluidized beds", Chemical Engineering Science 62 (2007) 28-44) (Year: 2007).*

Queteschiner et al. ("Adaptive Coarse-Graining for Large-Scale DEM Simulations", CFD, 2017, pp. 1-6) (Year: 2017).*

Bell et al. (Particle-Based Simulation of Granular Materials, Eurographics/ACM SIGGRAPH Symposium on Computer Animation (2005), pp. 1-9) (Year: 2005).*

Lu et al. (Coarse-Grained-Particle Method for Simulation of Liquid-Solids Reacting Flows, Ind. Eng. Chem. Res. 2016, 55, 10477-10491 ) (Year: 2016).*

Extended European Search Report dated Sep. 1, 2020 for European Patent Application No. 20171392.2.

Irizarry, "Fast Monte Carlo methodology for multivariate particulate systems—1: Point ensemble Monte Carlo," Chemical Engineering Science 63, pp. 95-110, (2008).

Hussain et al., "Mixing of rarefied gases in T-shape micromixers," Applied Thermal Engineering 146, pp. 39-44, (2018).

Korean Office Action dated Dec. 30, 2021 for Korean Patent Application No. 10-2020-0046421.

Korean Office Action dated May 7, 2021 for Korean Patent Application No. 10-2020-0046421.

* cited by examiner

PARTICLE BEHAVIOR SIMULATION SYSTEM

PARTICLE BEHAVIOR SIMULATION METHOD AND PARTICLE BEHAVIOR SIMULATION SYSTEM

CROSS-REFERENCE TO RELATED APPLICATION

This application claims priority pursuant to 35 U.S.C. § 119 from Japanese Patent Application No. 2019-84371, filed on Apr. 25, 2019, the entire disclosure of which is incorporated herein by reference.

BACKGROUND

The present disclosure relates to a particle behavior simulation method and a particle behavior simulation system.

Behavior of each particle in a system in which a powder including a plurality of particles exists is predicted or analyzed by simulation. For example, JP-A-2010-108183 describes a simulation method for analyzing behavior of a plurality of particles by applying an arithmetic processing based on a discrete element method on analysis target data indicating a state of a solid-liquid multiphase flow including a plurality of particles in liquid and solid phases by a computer, the simulation method including a coarse-grained model generation process of modeling groups each including some of the particles as coarse-grained particles whose particle diameter is larger than a particle diameter of the particles, and applying a coarse-graining processing to the analysis target data by setting predetermined forces, which act depending on sizes of the particle diameters in the solid-liquid multiphase flow, to be identical between the coarse-grained particles having a large particle diameter and the plurality of particles having small particle diameters constituting the coarse-grained particles, in which the arithmetic processing based on the discrete element method is applied on coarse-grained model data obtained according to the coarse-grained model generation process.

In the simulation method of JP-A-2010-108183, although behavior of particles in a large-scale system can be simulated by coarse-graining the particles, information of microscale particles smaller than the coarse-grained particles is lost, and therefore, a problem exists that accuracy of the simulation is impaired. In order to analyze a mixing process accurately by simulation, it is necessary to simulate a state of powder on a micro scale in addition to an overall movement of the powder in a mixing vessel. However, this is difficult for the simulation by the coarse-graining method in related arts as disclosed in JP-A-2010-108183, while on the other hand, in a simulation method without using coarse-grained particles, a problem exists that it takes a lot of time for calculation of particles in a large-scale system (mass production scale).

SUMMARY

The disclosure was achieved in view of such a situation, and an object thereof is to provide a particle behavior simulation method and a particle behavior simulation system capable of representing behavior of each particle in a large-scale particle system quickly and accurately.

One aspect of the disclosure is directed to a particle behavior simulation system including a processor and a memory. The particle behavior simulation system is configured to execute a coarse-graining processing of reconstituting a plurality of particles that mix with each other and constitute a predetermined powder as a particle system into a plurality of particle groups each including a plurality of the particles, an acting force calculation processing of calculating an acting force acting on each of the particle groups, and a mixing state calculation processing of calculating a parameter representing a mixing state of constituent particles of each of the particle groups after a predetermined time based on the calculated acting force.

According to the disclosure, behavior of each particle in a large-scale particle system can be represented quickly and accurately.

DETAILED DESCRIPTION OF THE EMBODIMENTS

Figure 1:
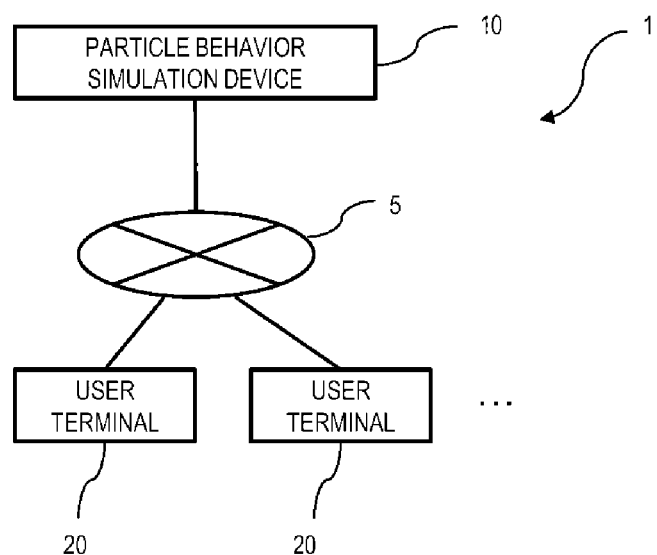
FIG. 1 is a diagram illustrating an example of a configuration of a particle behavior simulation system according to an embodiment.

Hereinafter, embodiments of the disclosure will be described with reference to drawings. FIG. 1 is a diagram illustrating an example of a configuration of a particle behavior simulation system 1 according to the present embodiment. The particle behavior simulation system 1 is configured by including a particle behavior simulation device 10 and one or a plurality of user terminals 20.

The particle behavior simulation device 10 predicts behavior of a plurality of particles that mix with each other and constitute a predetermined powder (particularly, a large-scale system powder) as a particle system.

The user terminal 20 accesses the particle behavior simulation device 10 to execute simulation of the powder. Then, the user terminal 20 receives a result of the simulation (analysis result data) from the particle behavior simulation device 10 and displays the result. The user terminal 20 and the particle behavior simulation device 10 are communicably connected by a wired or wireless communication network 5 such as a local area network (LAN), a wide area network (WAN), the Internet, or a dedicated line.

The powder in the present embodiment is, for example, a solid inorganic substance or organic compound or a mixture thereof used in various industrial fields, and is, for example, a ceramic material, a metal material, or a chemical. The powder system may be a mixture of a solid and a liquid, for example, a colloidal substance. The powder system may be a natural substance such as debris flow, quicksand, or drifting sand.

Figure 2:
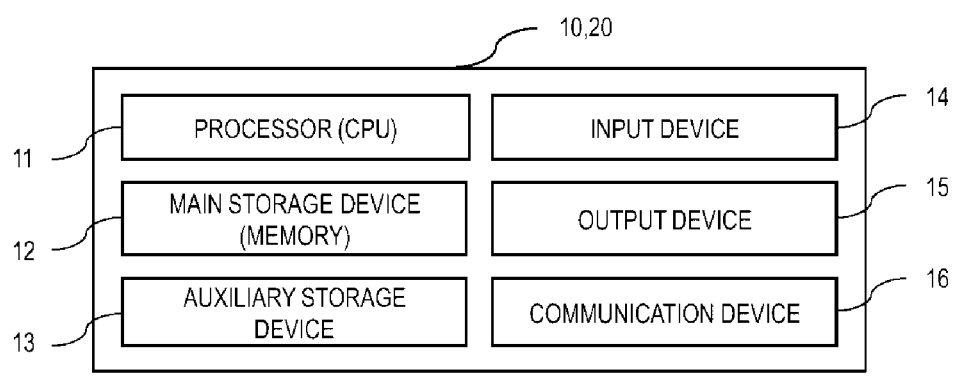
FIG. 2 is a diagram illustrating an example of hardware provided in a particle behavior simulation device and a user terminal.

FIG. 2 is a diagram illustrating an example of hardware provided in the particle behavior simulation device 10 and the user terminal 20. Each device is an information processing device including a processor 11 such as a central processing unit (CPU), a main storage device 12 such a random access memory (RAM) and a read only memory (ROM), an auxiliary storage device 13 such as hard disk drive (HDD) and solid state drive (SSD), an input device 14 including keyboard, mouse, touch panel and the like, an output device 15 for displaying a screen including a monitor (display) and the like, and a communication device 16 for communicating with each device.

Figure 3:
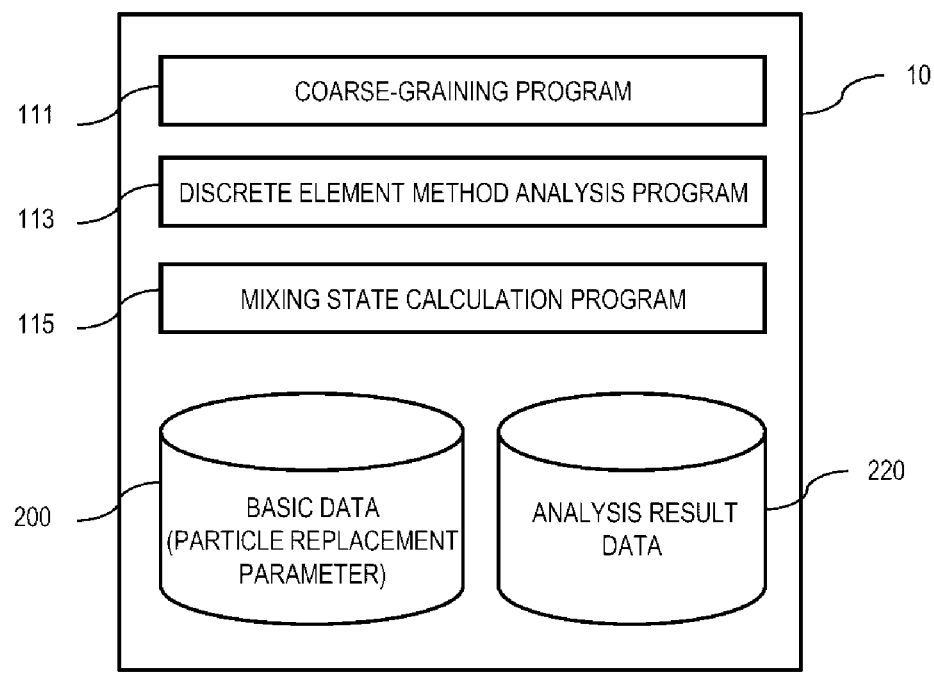
FIG. 3 is a diagram illustrating an example of functions provided in the particle behavior simulation device.

Next, FIG. 3 is a diagram illustrating an example of functions provided in the particle behavior simulation device 10. The particle behavior simulation device 10 stores a coarse-graining program 111, a discrete element method analysis program 113, and a mixing state calculation program 115 for implementing each function.

The coarse-graining program 111 performs a coarse-graining processing of reconstituting (replacing) a plurality of particles that mix with each other and constitute a predetermined powder by performing predetermined motion into a plurality of particle groups each including a plurality of the particles (hereinafter, the particle groups are referred to as coarse-grained particles). The coarse-graining program 111 performs an acting force calculation processing for calculating an acting force acting on each of the particle groups.

The discrete element method analysis program 113 performs a processing of calculating motion of the coarse-grained particles by a discrete element method (DEM).

The mixing state calculation program 115 calculates a parameter representing mixing state of constituent particles of each of the particle groups (coarse-grained particles) after a predetermined time based on the acting force calculated by the discrete element method analysis program 113. In the present embodiment, the mixing state calculation program 115 calculates a mixing ratio, which is a parameter indicating a changing ratio of a number of the constituent particles of each of the particle groups.

More specifically, the mixing state calculation program 115 determines presence or absence of collision between the particle groups by calculating positions of the particle groups (coarse-grained particles) based on the acting forces calculated by the discrete element method analysis program 113, and updates the parameter (mixing ratio) when it is determined that a collision exists.

In this case, when it is determined that the particle groups collide with each other, the particle behavior simulation device updates the parameter (mixing ratio) based on a particle replacement parameter (described later).

The particle behavior simulation device 10 stores the particle replacement parameter as a function depending on a collision velocity of the colliding particle groups.

The particle behavior simulation device 10 stores basic data 200, which is data necessary for the simulation, and analysis result data 220, which is information on the result of the simulation.

The particle behavior simulation device 10 stores the particle replacement parameter which is a parameter indicating a probability that the constituent particles are replaced between the particle groups at a time of collision between the particle groups (coarse-grained particles). The particle replacement parameter is stored in the basic data 200.

The particle replacement parameter depends on physical properties such as fluidity, cohesiveness, and specific gravity of the particle system as an analysis target. Therefore, a user may determine the particle replacement parameter by performing a mixing experiment or the like using a powder having predetermined physical properties in advance, and the particle behavior simulation device 10 may register the parameter in the basic data 200. The particle behavior simulation device 10 determines the particle replacement parameter in advance by performing a particle behavior simulation in a small-scale model using a small number of real-scale particles or coarse-grained particles, and registers the parameter in the basic data 200.

The analysis result data 220 includes data such as position, velocity, rotation velocity, and mixing ratio of each coarse-grained particle at a preset timing (in the present embodiment, at a predetermined time interval).

<User Terminal>

Figure 4:
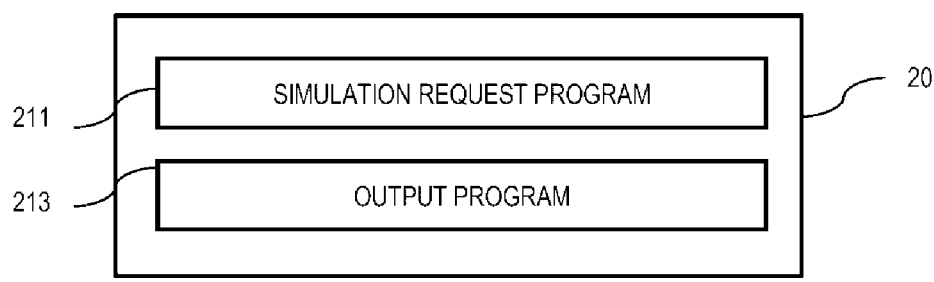
FIG. 4 is a diagram illustrating an example of functions provided in the user terminal.

Next, FIG. 4 is a diagram illustrating an example of functions provided in the user terminal 20. The user terminal 20 stores a simulation request program 211 and an output program 213 for implementing each function.

The simulation request program 211 transmits a simulation request to the particle behavior simulation device 10.

The output program 213 receives the analysis result data 220 generated by the particle behavior simulation device 10, and displays content of the received data on a predetermined screen.

The functions of the particle behavior simulation device 10 and the user terminal 20 described above are implemented by hardware of each device, or, by reading and executing each program stored in the main storage device 12 or the auxiliary storage device 13 by the processor 11 of each device. The programs are, for example, stored in storage devices such as a secondary storage device, a nonvolatile semiconductor memory, a hard disk drive, and an SSD, or non-temporary data storage media such as an IC card, an SD card, and a DVD that can be read by the information processing device.

<Description on Processing>

Next, a processing performed by the particle behavior simulation system 1 will be described. The particle behavior simulation system 1 performs a particle behavior simulation processing in which the particle behavior simulation device 10 executes a particle behavior simulation designated by the user terminal 20.

Figure 5:
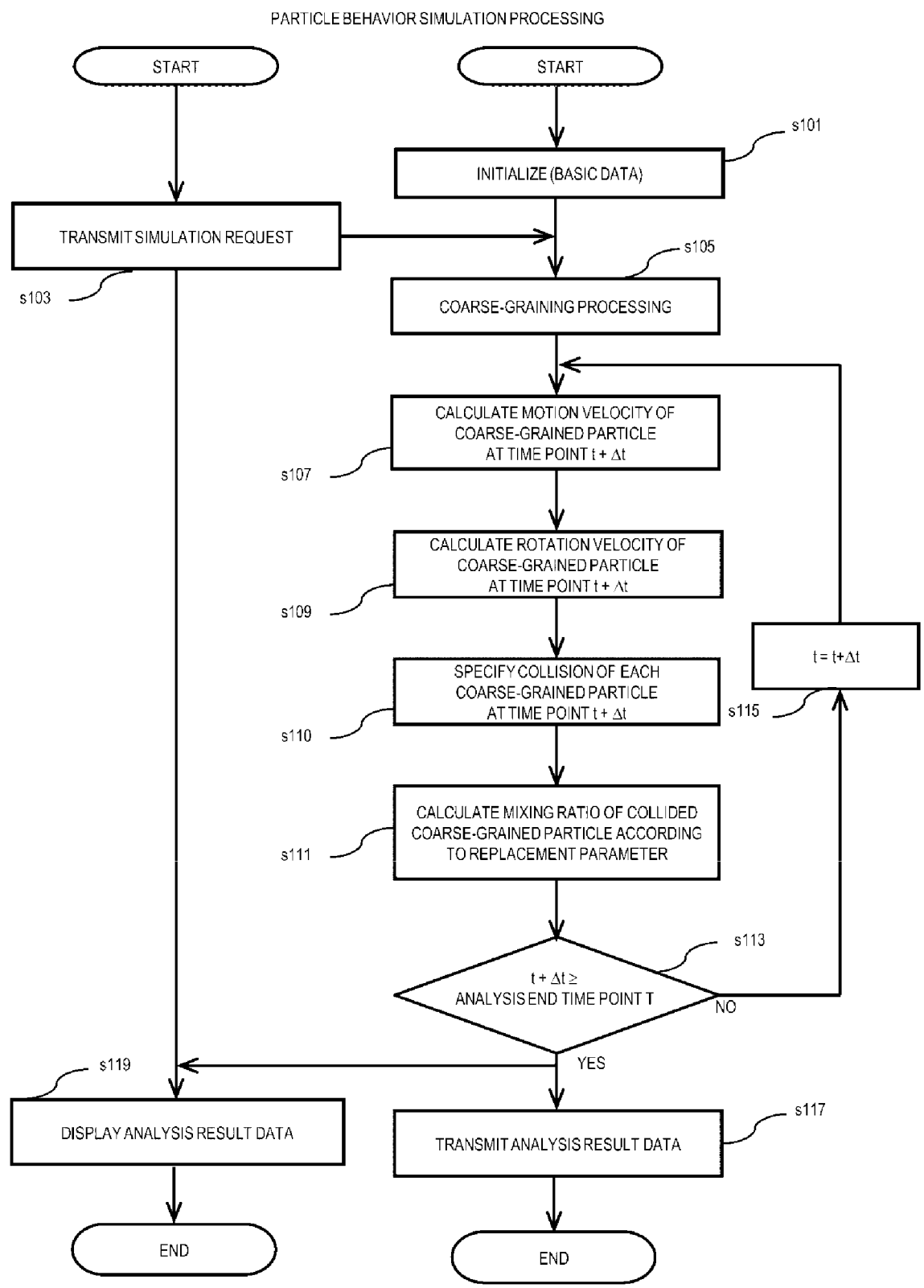
FIG. 5 is a flowchart illustrating an example of a particle behavior simulation processing.

FIG. 5 is a flowchart illustrating an example of the particle behavior simulation processing. The processing is started, for example, when predetermined data is input to the particle behavior simulation device 10.

First, the particle behavior simulation device 10 registers basic data for performing the particle behavior simulation in the basic data 200 (s101). Specifically, for example, the particle behavior simulation device 10 receives input of the particle replacement parameter and information that specifies a structure (for example, computer-aided design (CAD) data) of a container (for example, a stirring tank or a container rotary mixing device) that contains the powder from the user.

The basic data 200 thereof may be transmitted from the user terminal 20 as the simulation request.

Next, the user terminal 20 transmits the simulation request to the particle behavior simulation device 10 (s103).

Figure 6:
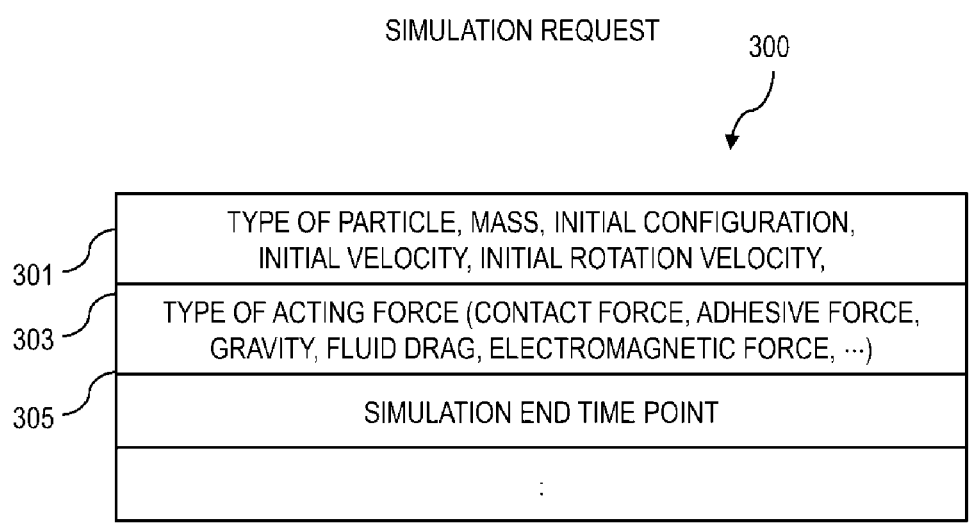
FIG. 6 is a diagram illustrating an example of a simulation request.

Here, FIG. 6 is a diagram illustrating an example of a simulation request 300. The simulation request 300 includes particle data 301 of the powder to be simulated (for example, information specifying a type of the particle, a mass of the particle, an initial configuration of the particle, an initial velocity, an initial rotation velocity of the particle), acting force data 303 for specifying the type of the acting forces of the coarse-grained particles and end time point data 305 for specifying an end time point (here, T) of the simulation.

The acting force data 303 is selected appropriately depending on an analysis purpose. The acting force data 303 includes, for example, a contact force (for example, elastic repulsive force, viscous damping force, and frictional force) due to another adjacent coarse-grained particle or another object (for example, a stirring machine); an adhesive force, a gravity, a fluid drag due to surrounding medium; or an electromagnetic force.

A part or all of the information of the simulation request 300 may be stored in the particle behavior simulation device 10 in advance.

As shown in s105 of FIG. 5, upon receiving the simulation request 300 from the user terminal 20, the particle behavior simulation device 10 initializes a time point (here, it is assumed that the time point is set to t=0), and then executes the coarse-graining processing.

That is, first, the particle behavior simulation device 10 converts particles indicated by the simulation request 300 into coarse-grained particles that are particle groups each including a preset number of the particles. At the time, the particle behavior simulation device 10 calculates a mass of each coarse-grained particle and a force acting on each coarse-grained particle.

Specifically, for example, the particle behavior simulation device 10 models a set of the particles into a particle having a spherical shape or another predetermined shape. The particle behavior simulation device 10 scales the acting force according to sizes of the coarse-grained particles and the like, based on the law of conservation of energy on various energies such as kinetic energy of each particle. Such a coarse-graining method is disclosed in, for example, "Sakai et al., Advanced Powder Technology, 23, 673-681 (2012)" and "Handbook of Pharmaceutical Wet Granulation 1st Edition: Theory and Practice in a Quality by Design Paradigm, pp. 765-789". The method of coarse-graining is not limited to the above, and any method may be used as long as the particle group is handled as a coarse-grained particle.

Then, the particle behavior simulation device 10 calculates an acting force F acting on each coarse-grained particle at a time point t. A calculation method of the acting force F of the coarse-grained particle differs depending on a type of the acting force F designated by the simulation request 300. For example, when the type of the acting force F is an adhesive force, the particle behavior simulation device 10 calculates the acting force F using the rotation velocity of the coarse-grained particle.

Next, the particle behavior simulation device 10 calculates the motion of each coarse-grained particle and calculates the mixing ratio by using a method such as the discrete element method (s107 to s115).

First, the particle behavior simulation device 10 calculates a motion velocity v of each coarse-grained particle at a time point t+Δt by using the acting force F calculated in s105 and a following motion equation (1) (s107).

$$m\frac{dv}{dt} = F \quad (1)$$

Here, F is the acting force acting on a certain coarse-grained particle, m is the mass of the certain coarse-grained particle, and v is the motion velocity of the certain coarse-grained particle.

The particle behavior simulation device 10 calculates a position of each coarse-grained particle at the time point t+Δt based on the position of each coarse-grained particle at the time point t and the motion velocity v calculated at s107. The particle behavior simulation device 10 calculates a rotation velocity ω of each coarse-grained particle at the time point t+Δt by using a following motion equation (2) based on the acting force F of each coarse-grained particle calculated in s107 (s109).

$$\frac{d\omega}{dt} = \frac{r \times F_t}{I} \quad (2)$$

Here, r is a radius vector of the coarse-grained particle, $F_t$ is a tangential component of the force acting on the coarse-grained particle, and I is a moment of inertia.

Next, the particle behavior simulation device 10 determines whether each coarse-grained particle collides with another coarse-grained particle based on the position of each coarse-grained particle at the time point t+Δt calculated in s109 (s110). Then, the particle behavior simulation device 10 calculates (updates) the mixing ratio for each colliding coarse-grained particle (s111).

The mixing ratio of a coarse-grained particle changes according to a replacement of constituent particles (real-scale particles) of the coarse-grained particle due to collision of the coarse-grained particles. That is, the particle behavior simulation device 10 calculates a number of particles $M_n$(t+Δt) in a coarse-grained particle n at the time point t+Δt using a following calculation formula (3), and thereby calculates the mixing ratio.

$$M_n(t+\Delta t) = M_n(t) + \Sigma_i (M_i(t) - M_n(t)) \times a(\Delta V_{n,i}(t)) \times \Delta V_{n,i}(t) \times \Delta t \quad (3)$$

Here, a is the particle replacement parameter, and $\Delta V_{n,i}$ is an absolute value of the collision velocity of another coarse-grained particle i relative to the coarse-grained particle n. That is, the mixing ratio depends on the collision velocity of each of the other coarse-grained particles (the collision velocity relative to the coarse-grained particle n) and the particle replacement parameter. Since the particle replacement parameter is assumed to depend on the collision velocity between the coarse-grained particles as shown in the calculation formula (3), the particle behavior simulation device 10 may register the particle replacement parameter in the basic data 200 in a form of a table or a relational expression, in which the collision velocity of each of the coarse-grained particles is set as a variable.

The particle behavior simulation device 10 determines whether the time point t+Δt is after a simulation end time point T (s113), and if the time point t+Δt is before the simulation end time point T (s113: NO), the time point is advanced by Δt (s115), and processing after s107 is executed again. On the other hand, if the time point t+Δt is after the simulation end time point T (s113: YES), processing s117 is performed.

In s117, the particle behavior simulation device 10 transmits the analysis result data (data such as position, velocity, rotation velocity, and mixing ratio of each coarse-grained particle at the simulation end time point T) calculated up to sill to the user terminal 20 that has transmitted the simulation request. Then, the user terminal 20 displays information of the received analysis result data on the output device 15 (s119).

The user terminal 20 may display a screen indicating a simulation result. For example, the user terminal 20 displays a screen displaying initial state information 401 designated by the simulation request 300, and an analysis result data content 403 (a particle position after the simulation ends, a view in which a density of the mixing ratio is superimposed on a CAD view, the mixing ratio at a selected position, and the like).

As described above, the particle behavior simulation system 1 according to the present embodiment reconstitutes the plurality of particles that mix with each other and constitute the powder into the plurality of particle groups (coarse-grained particles) each including a plurality of the particles, and calculates the parameter representing the mixing state of constituent particles of the particle groups after the predetermined time based on the acting force acting on each of the coarse-grained particles. Thereby, the mixing state of the constituent particles of the particle groups can be analyzed in detail. Further, a calculation time can be shortened by calculating the acting force of each of the coarse-grained particles, and since the calculation based on the coarse-grained particles is also performed in a mixing state, the calculation time does not significantly increase in such a state. That is, it is possible to analyze a mixing state in a scale smaller than a coarse-grained particle size and simulate behavior of large-scale particles in a mixing process of mass production scale in realistic time. Accordingly, behavior of each particle in a large-scale particle system can be represented quickly and accurately by the particle behavior simulation system 1 according to the present embodiment.

The above description of the embodiment is intended to facilitate understanding of the disclosure and is not intended to limit the disclosure. The disclosure can be modified and improved without departing from its spirit and includes equivalents thereof.

For example, apart or all of the functions of the user terminal 20 may be provided in the particle behavior simulation device 10. For example, the analysis result data may be output by the particle behavior simulation device 10 instead of the user terminal 20.

In the present embodiment, the particle behavior simulation device 10 performs the coarse-graining processing based on the data of the real-scale particles designated by the simulation request 300, but may also receive a simulation request 300 including data of particles on which the coarse-graining processing is performed (size and mass of the particles, the forces acting on the particles, and the like).

In the present embodiment, the particle behavior simulation device 10 calculates the motion velocity, the rotation velocity, and the mixing ratio of the coarse-grained particle sequentially, but may also calculate the mixing ratio when calculating the motion velocity of the coarse-grained particle.

In the present embodiment, although the particle behavior simulation device 10 calculates the particle replacement parameter previously, the particle behavior simulation device 10 may also store a predetermined program for calculating the particle replacement parameter by a predetermined simulation analysis in advance, and calculate the particle replacement parameter by executing the program in the particle behavior simulation processing.

According to the above description of the description, at least the following is clarified. That is, in the mixing state calculation processing, the particle behavior simulation system may calculate the mixing ratio which is a parameter indicating the changing ratio of the number of the constituent particles of each of the particle groups.

Accordingly, the mixing state of the particles in the powder can be determined objectively by calculating the mixing ratio which is the parameter indicating the changing ratio of the number of constituent particles of the particle groups.

In the mixing state calculation processing, the particle behavior simulation system may determine whether a collision exists between the particle groups by calculating the positions of the particle groups based on the calculated acting forces, and update the parameter when it is determined that a collision exists.

Accordingly, the mixing state of the particles can be calculated accurately and efficiently by updating the parameter (mixing ratio) when it is determined that a collision exists between the particle groups.

The particle behavior simulation system may execute a parameter storing processing that stores the particle replacement parameter which is a parameter indicating the probability that constituent particles are replaced between the particle groups at the time of collision between the particle groups, and update the parameter based on the particle replacement parameter when it is determined that particle groups collided with each other in the mixing state calculation processing.

Accordingly, the mixing state of the particles can be predicted accurately by updating the parameter (mixing ratio) based on the particle replacement parameter indicating the probability that particles are replaced between particle groups at the time of collision between the particle groups.

The particle behavior simulation system may store the particle replacement parameter as a function depending on collision velocity of the collided particle groups.

Easiness of replacement of the particle group can be represented precisely by setting the particle replacement parameter as the function depending on collision velocity of the particle groups.

The particle behavior simulation system may execute an output processing that outputs information on the calculated parameter.

Accordingly, the user can grasp an analysis result of the mixing state of the particles by outputting the information of the calculated parameter (mixing ratio).

The invention claimed is:

1. A particle behavior simulation method, executed with a particle behavior simulation system including a processor and a memory, comprising:
    predicting behavior of constituent particles that mix with each other and constitute a predetermined powder by simulating a particle system in which each of a plurality of particle groups is a course grain particle that represents a number of the constituent particles in a simulated mixing process;
    determining a force acting on each of the particle groups;
    determining, as a mixing state parameter, a number of the constituent particles represented in the simulation by each of the particle groups after a predetermined time interval based on the force acting on each of the particle groups,
        wherein in determining the number of the constituent particles represented in the simulation by each of the particle groups, the particle behavior simulation system determines whether a collision exists between the particle groups by determining positions of the particle groups based on the force acting on each of the particle groups, and updates the number when it is determined that a collision exist;
    determines a collision velocity as a parameter associated with a particle replacement parameter indicating a probability that the constituent particles represented by the particle groups are replaced between the particle groups at a time of collision between the particle groups; and
    updates the collision velocity parameter based on the particle replacement parameter when it is determined that the particle groups collide with each other.

2. The particle behavior simulation method according to claim 1, wherein in determining the number of the constituent particles represented in the simulation by each of the particle groups, the particle behavior simulation system determines a mixing ratio as a parameter indicating a change in a ratio of the number of the constituent particles represented by each of the particle groups after the predetermined time interval.

3. The particle behavior simulation method according to claim 1, wherein the particle behavior simulation system stores the particle replacement parameter as a function depending on the collision velocity of each of the colliding particle groups.

4. The particle behavior simulation method according to claim 1, wherein the particle behavior simulation system outputs information on the collision velocity parameter.

5. A particle behavior simulation system comprising a processor and a memory, configured to execute simulation functions comprising:
    predicting behavior of constituent particles that mix with each other and constitute a predetermined powder by simulating a particle system in which each of a plurality of particle groups is a course grain particle representing a number of the constituent particles in a simulated mixing process;
    determining a force acting on each of the particle groups;
    determining, as a mixing state parameter, a number of the constituent particles represented by each of the particle groups after a predetermined time interval based on the force acting on each of the particle groups,
        wherein the particle behavior simulation system is configured to, in determining the number of the constituent particles represented by each of the particle groups determine whether a collision exists between the particle groups by determining positions of the particle groups based on the force acting on each of the particle groups, and update the number when it is determined that a collision exists;
    determine a collision velocity vector as a parameter associated with a particle replacement parameter indicating a probability that the constituent particles represented by the particle groups are replaced between the particle groups at a time of collision between the particle groups; and
    update the collision velocity parameter based on the particle replacement parameter when it is determined that the particle groups collide with each other.

6. The particle behavior simulation system according to claim 5, wherein the particle behavior simulation system is configured to, in determining the number of the constituent particles represented by each of the particle groups, determine a mixing ratio which is as a parameter indicating a change in a ratio of the number of the constituent particles represented by each of the particle groups.

7. The particle behavior simulation system according to claim 5, wherein
    the particle behavior simulation system is configured to store the particle replacement parameter as a function depending on the collision velocity of each of the colliding particle groups.

8. The particle behavior simulation system according to claim 5, wherein the particle behavior simulation system is configured to output information on the first parameter.

* * * * *